US012282689B2

(12) United States Patent
Vankamamidi et al.

(10) Patent No.: US 12,282,689 B2
(45) Date of Patent: Apr. 22, 2025

(54) DYNAMIC REDUNDANT ARRAY OF INDEPENDENT DISKS (RAID) TRANSFORMATION

(71) Applicant: Dell Products L.P., Round Rock, TX (US)

(72) Inventors: Vamsi K. Vankamamidi, Hopkinton, MA (US); Amitai Alkalay, Kadima (IL); Thomas Dibb, Rutland, MA (US)

(73) Assignee: Dell Products L.P., Round Rock, TX (US)

( * ) Notice: Subject to any disclaimer, the term of this patent is extended or adjusted under 35 U.S.C. 154(b) by 206 days.

(21) Appl. No.: 17/872,497

(22) Filed: Jul. 25, 2022

(65) Prior Publication Data

US 2024/0028267 A1    Jan. 25, 2024

(51) Int. Cl.
G06F 3/00    (2006.01)
G06F 3/06    (2006.01)

(52) U.S. Cl.
CPC .......... *G06F 3/0689* (2013.01); *G06F 3/0604* (2013.01); *G06F 3/0629* (2013.01); *G06F 3/065* (2013.01)

(58) Field of Classification Search
None
See application file for complete search history.

(56) References Cited

U.S. PATENT DOCUMENTS

| | | | |
|---|---|---|---|
| 7,958,304 B1 * | 6/2011 | Goel | G06F 11/1096 711/170 |
| 10,241,712 B1 | 3/2019 | Elliott, IV et al. | |
| 10,346,057 B1 | 7/2019 | Martin et al. | |
| 10,346,064 B1 | 7/2019 | O'Hare et al. | |
| 10,496,307 B1 | 12/2019 | Peros et al. | |
| 10,496,316 B1 | 12/2019 | Proulx et al. | |
| 10,846,003 B2 | 11/2020 | Danilov et al. | |
| 10,860,236 B2 | 12/2020 | Krasner et al. | |
| 11,003,374 B2 | 5/2021 | Han et al. | |
| 11,023,149 B1 | 6/2021 | Altaye et al. | |
| 11,029,865 B2 | 6/2021 | Danilov et al. | |
| 11,042,324 B2 | 6/2021 | Shveidel et al. | |
| 11,163,459 B2 | 11/2021 | Chiu et al. | |
| 11,231,859 B2 | 1/2022 | Han et al. | |
| 11,449,399 B2 | 9/2022 | Danilov et al. | |
| 2012/0278526 A1 * | 11/2012 | Cho | G06F 3/0632 711/E12.083 |
| 2017/0270018 A1 * | 9/2017 | Xiao | G06F 3/0617 |
| 2022/0214823 A1 * | 7/2022 | Lee | G06F 3/0689 |

* cited by examiner

*Primary Examiner* — Midys Rojas
(74) *Attorney, Agent, or Firm* — BainwoodHuang (57) ABSTRACT

A technique is directed to providing dynamic redundant array of independent disks (RAID) transformation which involves measuring a set of storage array parameters for an existing RAID configuration residing in a storage array. The technique further involves identifying a new RAID configuration to use in place of the existing RAID configuration based on the measured set of storage array parameters. The technique further involves, after the new RAID configuration is identified, transforming the existing RAID configuration into the new RAID configuration.

20 Claims, 6 Drawing Sheets

DYNAMIC REDUNDANT ARRAY OF INDEPENDENT DISKS (RAID) TRANSFORMATION

BACKGROUND

A conventional data storage system includes storage processors (SPs) and disks. The SPs write host data into and read host data from the disks on behalf of input/output (I/O) requests from host computers.

Prior to data storage system operation, a human operator creates redundant array of independent disks (RAID) segments (or extents) from the disks that will eventually hold the host data. In particular, the human operator identifies a particular RAID-type (e.g., RAID1, RAID5, RAID6, etc.) and a particular RAID-width (e.g., 2 disks, 5 disks, 9 disks, etc.) for each RAID segment.

SUMMARY

It should be understood there may be deficiencies to the above-described conventional data storage system. Along these lines, the particular RAID-type and the particular RAID-width for each RAID segment are picked only at the time of creating that RAID segment. That is, once the conventional data storage system maps disk segments to create the RAID segment, the initially-picked type and width of the RAID segment remain static thereafter.

Unfortunately, changes to the data storage system over time may make the initially-picked RAID-type and the initially-picked RAID-width for the RAID segment suboptimal or even obsolete. For example, over time, certain disks may be replaced, added, removed, etc. Additionally, the loading, traffic, throughput, etc. of the data storage system may change over time. Accordingly, the initially-picked RAID-type and RAID-width for the RAID segment may no longer satisfy various targets or goals such as performance and/or reliability requirements (e.g., 5 9s), service level objectives (e.g., throughput, the ability to recover or rebuild within a set time), and so on.

In contrast to the above-described conventional data storage system, improved techniques are directed to providing dynamic RAID transformation in which a storage array transforms an existing RAID configuration into a new RAID transformation while the storage array remains in operation. Along these lines, for an existing RAID configuration that currently stores data, specialized circuitry determines an appropriate new RAID configuration suitable for the storage array to satisfy certain requirements (e.g., to maintain a desired reliability such as 5 9s). Then, the specialized circuitry transforms the existing RAID configuration into the new RAID configuration. For example, the specialized circuitry may automatically unmap and/or remap all or part of the existing RAID configuration, move data, etc. to generate the new RAID configuration in real-time while the storage array remains available. Accordingly, such techniques provide a dynamic mechanism to optimize RAID overhead and performance while maintaining desired reliability.

One embodiment is directed to a method of providing RAID transformation which includes measuring (or sensing) a set of storage array parameters for an existing RAID configuration residing in a storage array. The method further includes identifying a new RAID configuration to use in place of the existing RAID configuration based on the measured set of storage array parameters. The method further includes, after the new RAID configuration is identified, transforming the existing RAID configuration into the new RAID configuration.

Another embodiment is directed to electronic equipment which includes memory and control circuitry coupled to the memory. The memory stores instructions which, when carried out by the control circuitry, cause the control circuitry to perform a method of:

(A) measuring a set of storage array parameters for an RAID configuration residing in a storage array, (B) identifying a new RAID configuration to use in place of the existing RAID configuration based on the measured set of storage array parameters, and (C) after the new RAID configuration is identified, transforming the existing RAID configuration into the new RAID configuration.

Yet another embodiment is directed to a computer program product having a non-transitory computer readable medium which stores a set of instructions to provide dynamic RAID transformation. The set of instructions, when carried out by computerized circuitry, causes the computerized circuitry to perform a method of:

(A) measuring a set of storage array parameters for an existing RAID configuration residing in a storage array;

(B) identifying a new RAID configuration to use in place of the existing RAID configuration based on the measured set of storage array parameters; and (C) after the new RAID configuration is identified, transforming the existing RAID configuration into the new RAID configuration.

In some arrangements, the existing RAID configuration is a first RAID configuration having a first RAID type and a first RAID width. Additionally, identifying the new RAID configuration includes inputting the measured set of storage array parameters into a RAID engine which is constructed and arranged to perform a RAID configuration identification operation that specifies, as the new RAID configuration, a second RAID configuration having a second RAID type and a second RAID width. Furthermore, at least one of: (i) the first RAID type is different from the second RAID type and (ii) the first RAID width is different from the second RAID width.

In some arrangements, the method further includes configuring the RAID engine to perform RAID configuration identification operations that select the recommended RAID configurations from a plurality of possible RAID configurations based on different sets of storage array parameters.

In some arrangements, the method further includes directing the RAID engine to periodically perform new RAID configuration identification operations in response to a predefined schedule.

In some arrangements, the method further includes directing the RAID engine to perform new RAID configuration identification operations in response to predefined events.

In some arrangements, a set of storage objects resides within the existing RAID configuration prior to transforming. Additionally, transforming the existing RAID configuration into the new RAID configuration includes performing a RAID configuration transformation operation that provides the new RAID configuration in place of the existing RAID configuration, the set of storage objects residing within the new RAID configuration upon completion of the RAID configuration transformation operation.

In some arrangements, the existing RAID configuration provides a first level of RAID redundancy. Additionally, performing the RAID configuration transformation operation includes providing the new RAID configuration with a second level of RAID redundancy that is higher than the first level of RAID redundancy.

In some arrangements, the existing RAID configuration provides a RAID Level 5 data protection scheme as the first level of RAID redundancy. Additionally, providing the new RAID configuration includes providing a RAID Level 6 data protection scheme as the second level of RAID redundancy that is higher than the first level of RAID redundancy.

In some arrangements, the existing RAID configuration provides a first level of RAID redundancy. Additionally, performing the RAID configuration transformation operation includes providing the new RAID configuration with a second level of RAID redundancy that is lower than the first level of RAID redundancy.

In some arrangements, the existing RAID configuration provides a RAID Level 6 data protection scheme as the first level of RAID redundancy. Additionally, providing the new RAID configuration includes providing a RAID Level 5 data protection scheme as the second level of RAID redundancy that is higher than the first level of RAID redundancy.

In some arrangements, the existing RAID configuration provides a first RAID width. Additionally, performing the RAID configuration transformation operation includes providing the new RAID configuration with a second RAID width that is wider than the first RAID width.

In some arrangements, the first RAID width includes a first number of storage devices. Additionally, providing the new RAID configuration includes providing the new RAID configuration with, as the second RAID width, a second number of storage devices that is larger than the first number of storage devices.

In some arrangements, the existing RAID configuration provides a first RAID width. Additionally, performing the RAID configuration transformation operation includes providing the new RAID configuration with a second RAID width that is narrower than the first RAID width.

In some arrangements, the first RAID width includes a first number of storage devices. Additionally, providing the new RAID configuration includes providing the new RAID configuration with, as the second RAID width, a second number of storage devices that is smaller than the first number of storage devices.

In some arrangements, measuring the set of storage array parameters for the existing RAID configuration includes assessing a current count of storage devices available to the existing RAID configuration.

In some arrangements, the new RAID configuration is identified based on the current count of storage devices available to the existing RAID configuration being different from a previous count of storage devices available to the existing RAID configuration. Additionally, transforming the existing RAID configuration into the new RAID configuration includes automatically changing storage segment mappings and moving data among storage segment mappings in response to identifying the new RAID configuration.

It should be understood that, in the cloud context, certain circuitry may be formed by remote computer resources distributed over a network. Such an electronic environment is capable of providing certain advantages such as high availability and data protection, transparent operation and enhanced security, big data analysis, etc.

Other embodiments are directed to electronic systems and apparatus, processing circuits, computer program products, and so on. Certain embodiments are directed to various methods, electronic components and circuitry which are involved in providing dynamic RAID transformation.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

An improved technique is directed to providing dynamic redundant array of independent disks (RAID) transformation in which a storage array transforms an existing RAID configuration into a new RAID transformation while the storage array remains in operation. Along these lines, for an existing RAID configuration that currently stores data, specialized circuitry determines an appropriate new RAID configuration suitable for the storage array to satisfy certain requirements (e.g., to maintain a desired reliability such as 5 9s, to impose rebuild time limits, etc.). In some situations, the existing RAID configuration may be compliant but suboptimal while the new RAID configuration will provide more efficient and/or effective allocation of resources. Then, the specialized circuitry transforms the existing RAID configuration into the new RAID configuration. For example, the specialized circuitry may automatically unmap and/or remap drive segments of all or part of the existing RAID configuration, move data, generate new parity, etc. to generate the new RAID configuration in real-time while the storage array remains available. As a result, such techniques provide a dynamic mechanism to optimize RAID overhead and performance while maintaining desired reliability.

Figure 1:
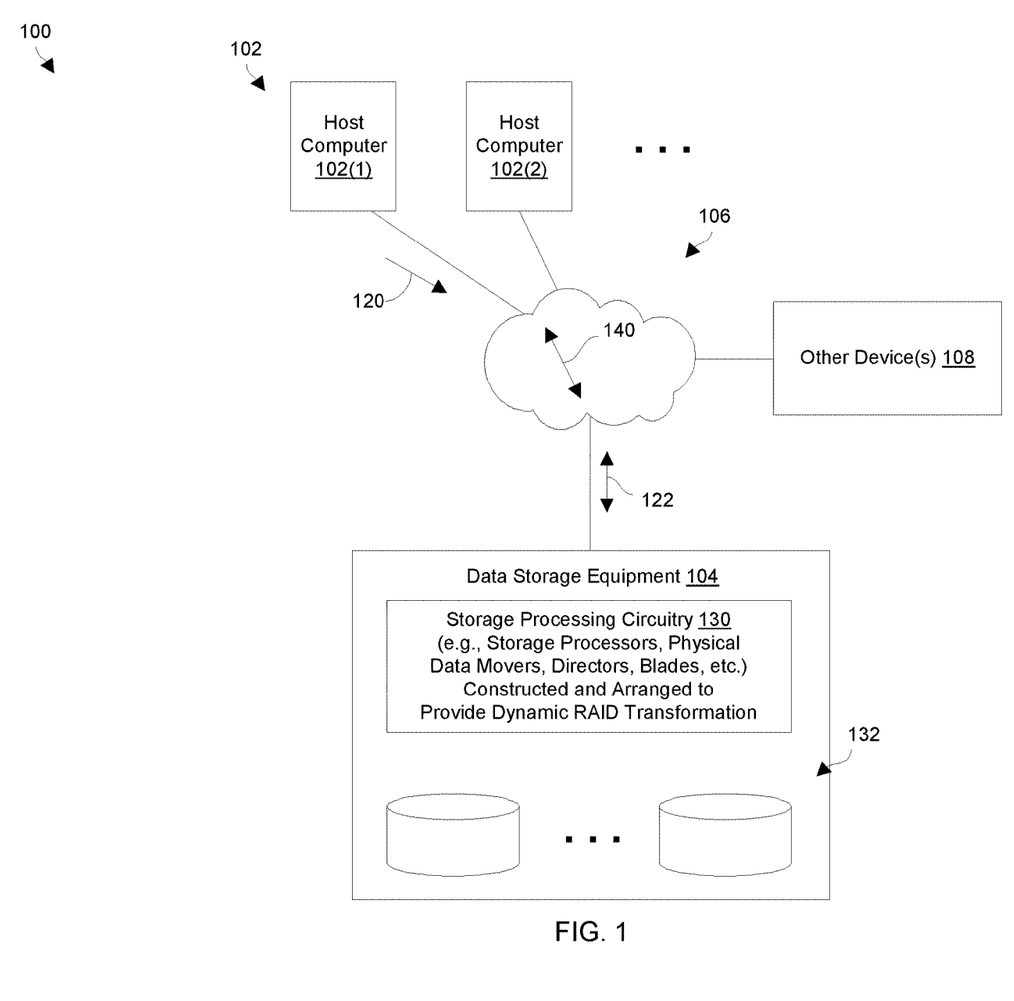
FIG. 1 is a block diagram of a storage system setting which provides dynamic redundant array of independent disks (RAID) transformation in accordance with certain embodiments.

FIG. 1 is a block diagram of a storage system setting 100 which provides dynamic RAID transformation in accordance with certain embodiments. The storage system setting 100 includes host computers 102(1), 102(2), . . . (collectively, host computers 102), data storage equipment 104, a communications medium 106, and perhaps other devices 108.

Each host computer 102 is constructed and arranged to perform useful work. For example, one or more of the host computers 102 may operate as a file server, a web server, an email server, an enterprise server, a database server, a transaction server, combinations thereof, etc. which provides host input/output (I/O) requests 120 to the data storage equipment 104. In this context, the host computers 102 may provide a variety of different I/O requests 120 (e.g., block and/or file based write commands, block and/or file based read commands, combinations thereof, etc.) that direct the data storage equipment 104 to richly and reliably store host data 122 within and retrieve host data 122 from storage (e.g., primary storage or main memory, secondary storage, tiered storage, combinations thereof, etc.).

The data storage equipment 104 (e.g., a storage array, a storage system, etc.) includes storage processing circuitry 130 and storage devices 132. The storage processing circuitry 130 is constructed and arranged to respond to the host I/O requests 120 from the host computers 102 by writing data into the storage devices 132 and reading the data from the storage devices 132.

The storage processing circuitry 130 may include one or more physical storage processors (SPs) or engines, data movers, director boards, blades, I/O modules, storage device controllers, switches, other hardware, combinations thereof, and so on. The storage devices 132 provide persistent/non-volatile storage in accordance with one or more RAID data protection schemes and may include one or more types of storage drives, e.g., non-volatile random access memory (NVRAM) devices, solid state drives (SSDs), hard disk drives (HDDs), combinations thereof, and so on.

In accordance with certain embodiments, at least some of the storage devices 132 provide non-volatile storage using a mapped-RAID architecture (e.g., by combining drive segments from a drive segment pool to form a RAID extent in a fault domain with a RAID extent width that is narrower than the number of drives in the fault domain). Moreover, in accordance with certain embodiments, various physical componentry may be virtualized for additional flexibility, fault tolerance, load balancing, and so on (e.g., virtual data movers, virtual storage devices, etc.).

The communications medium 106 is constructed and arranged to connect the various components of the storage system setting 100 together to enable these components to exchange electronic signals 140 (e.g., see the double arrow 140). At least a portion of the communications medium 106 is illustrated as a cloud to indicate that the communications medium 106 is capable of having a variety of different topologies including backbone, hub-and-spoke, loop, irregular, combinations thereof, and so on. Along these lines, the communications medium 106 may include copper-based data communications devices and cabling, fiber optic devices and cabling, wireless devices, combinations thereof, etc. Furthermore, the communications medium 106 is capable of supporting LAN-based communications, SAN-based communications, cellular communications, WAN-based communications, distributed infrastructure communications, other topologies, combinations thereof, etc.

The other devices 108 represent other possible componentry of the storage system setting 100. Along these lines, the other devices 108 may include remote data storage equipment that provides data to and/or receives data from the data storage equipment 104 (e.g., replication arrays, backup and/or archiving equipment, service processors and/or management/control devices, combinations thereof, etc.).

During operation and as will be explained in further detail shortly, the storage processing circuitry 130 processes the host I/O requests 120 to richly and robustly manage the host data 122 on behalf of the host computers 102. Such operation involves implementing one or more RAID data protection schemes (e.g., RAID1, RAID5, RAID6, etc.) while adhering to one or more constraints (e.g., to satisfy I/O requests 120 with a certain minimal latency, to rebuild data on a failed drive within a certain amount of time, to withstand a certain number of drive failures, etc.).

Such operation may involve maintaining storage objects (e.g., LUNS, volumes, virtual volumes, etc.) containing data (e.g., host data, metadata, configuration data, combinations thereof, etc.) using appropriate RAID data protection schemes. To this end, the data storage equipment 104 is capable of providing dynamic RAID transformation in which an existing RAID configuration is transformed into a new RAID transformation while the data storage equipment 104 remains in operation (i.e., high availability). Other terms for a RAID configuration include a RAID extent, an Uber, a RAID segment, and so on. Further details will now be provided with reference to FIG. 2.

Figure 2:
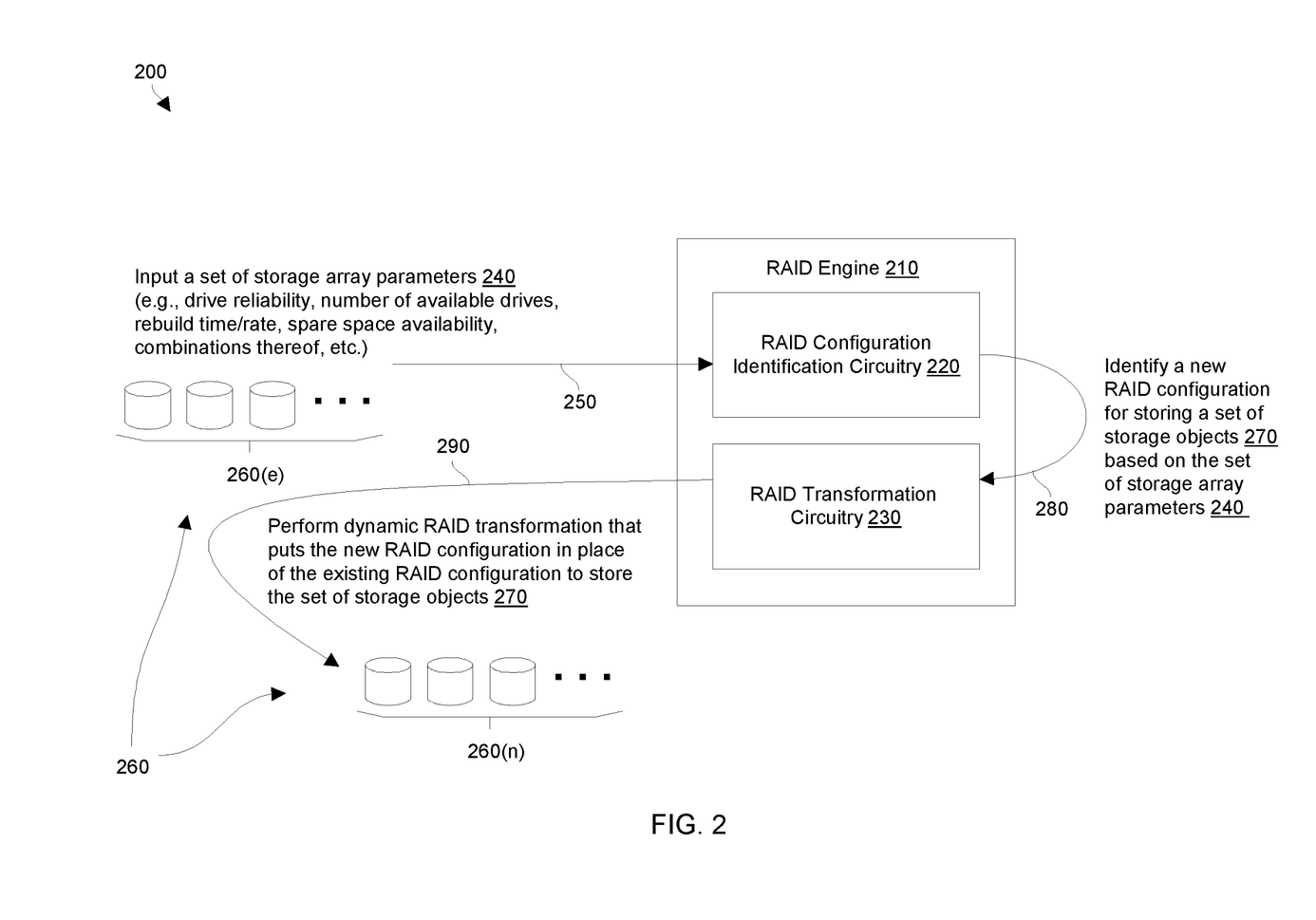
FIG. 2 is a block diagram of a RAID engine of the storage system setting of FIG. 1 in accordance with certain embodiments.

FIG. 2 shows a view 200 of certain details for a RAID engine 210 in accordance with certain embodiments. As shown, the RAID engine 210 includes RAID configuration identification circuitry 220 and RAID transformation circuitry 230. The RAID configuration identification circuitry 220 and RAID transformation circuitry 230 are coupled with each other.

However, there is no requirement that the RAID configuration identification circuitry 220 and RAID transformation circuitry 230 must be co-located. In some arrangements, all or portions of the RAID engine 210 reside within the data storage equipment 104, e.g., as part of or separate from the storage processing circuitry 104 (also see FIG. 1). In other arrangements, all or portions of the RAID engine 210 are external to the data storage equipment 104, e.g., by residing within the other device(s) 108.

The RAID configuration identification circuitry 220 is constructed and arranged to input sets of storage array parameters (or metrics) 240 (see arrow 250) for existing RAID configurations 260 that store storage objects 270 (e.g., LUNS, volumes, virtual volumes, file systems, file systems within LUNS, etc.) and identify (e.g., recommend) suitable RAID configurations 260 based on the sets of storage array parameters 240 perhaps among other things (see arrow 280). Example storage array parameters 240 include drive reliability, numbers of available drives, maximum rebuild times, maximum rebuild rates, combinations thereof, etc.

The RAID transformation circuitry 230 is constructed and arranged to transform existing RAID configurations 260 into new RAID configurations 260 based on direction from the RAID configuration identification circuitry 220. Such transformation may involve changing the RAID-type (e.g., RAID5 to RAID6) and/or the RAID width (e.g., RAID5(4+1) to RAID5(8+1)) of an existing RAID configuration 260.

For example, for an existing RAID configuration 260(*e*) that holds a set of storage objects 270 and based on a set of storage array parameters 240, the RAID configuration identification circuitry 220 may identify an optimal RAID-type and optimal RAID-width. If the identified optimal RAID-type and the identified optimal RAID-width are the same as the current RAID-type and the current RAID-width of the existing RAID configuration 260(*e*), the RAID configuration identification circuitry 220 may decide that no RAID transformation is necessary for the existing RAID configuration 260(*e*). Accordingly, the RAID configuration identification circuitry 220 does not direct the RAID transformation circuitry 230 to perform a RAID transformation operation. Thus, the existing RAID configuration 260(*e*) continues to simply hold the set of storage objects 270.

However, if the identified optimal RAID-type is different from the current RAID-type of the existing RAID configuration 260(*e*) or if the identified optimal RAID-width is different from the current RAID-width of the existing RAID configuration 260(*e*) (or both), the RAID configuration identification circuitry 220 may decide that RAID transformation should be performed on the existing RAID configuration 260(e). Performance of the RAID transformation operation may involve unmapping or removing drive segments, remapping or adding drive segments, generating new parity, copying and/or moving data, combinations thereof, and so on. Such activities may involve leveraging existing services/modules/etc. such as a garbage collection service to move data in solid state storage, RAID services to generate parity, etc. Accordingly, the RAID configuration identification circuitry 220 directs the RAID transformation circuitry 230 to perform a RAID transformation operation that replaces the existing RAID configuration 260(e) with a new RAID configuration 260(n) having the identified optimal RAID-type and the identified optimal RAID-width (arrow 290). After completion of the RAID transformation operation, the set of storage objects 270 that resided within the existing RAID configuration 260(e) is protected within the new RAID configuration 260(n). Further details will now be provided with reference to FIG. 3.

Figure 3:
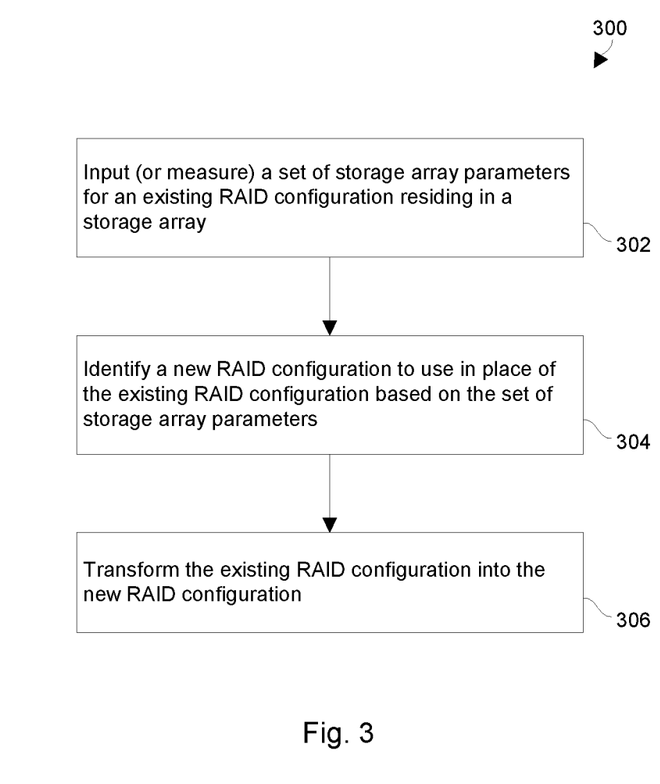
FIG. 3 is a flowchart of a procedure of providing dynamic RAID transformation in accordance with certain embodiments

FIG. 3 is a flowchart of a procedure 300 of providing dynamic RAID transformation in accordance with certain embodiments. The procedure may be performed by specialized circuitry such as the earlier-mentioned RAID engine 210 (also see FIG. 2).

At 302, the specialized circuitry inputs (e.g., measures) a set of storage array parameters for an existing RAID configuration residing in a storage array. Such storage array parameters may be taken while the storage array (e.g., see the data storage equipment 104 in FIG. 1) is in operation and the existing RAID configuration stores a set of storage objects (e.g., one or more LUNs, volumes, etc.).

At 304, the specialized circuitry identifies (or recommends for approval) a new RAID configuration to use in place of the existing RAID configuration based on the set of storage array parameters. The new RAID configuration may differ from the existing RAID configuration in one or more ways (e.g., different RAID-type, different RAID-width, both, etc.).

At 306, after the new RAID configuration is identified, the specialized circuitry transforms the existing RAID configuration into the new RAID configuration. Such operation may involve unmapping and remapping drive segments, generating parity, moving data, etc.

In some embodiments, such transformation may begin with an alert or notification to make a user (e.g., a human administrator) aware. In some arrangements, such transformation is triggered and initiated automatically without need of any user intervention in order to achieve dynamic RAID transformation responsive to current parameters. In alternative arrangements, such transformation awaits approval from the user prior to fully commencing.

Upon completion of the RAID transformation operation, the set of storage objects that resided in the existing RAID configuration now reside in the new RAID configuration which is optimized for performance, reliability, efficiency, etc. Certain safeguards may be implemented to prevent the storage array from performing RAID transformations too frequently in a manner that would impact performance (e.g., thresholds, timers, policies, etc.).

It should be understood that various storage array parameters are suitable for use by the specialized circuitry. Such parameters may be predefined (e.g., preset in order to achieve certain requirements such as a maximum rebuild time, etc.), may be determined on the fly (or in real-time) based on current storage array conditions/behavior (e.g., based on the current number of drives, drive failures, rebuilds in progress, loading, etc.), combinations thereof, etc.

For example, the RAID engine may input (or sense) one or more actual drive reliability measurements such as one or more mean time between failure (MTBF) metrics, uncorrectable bit error rates (UBERs), etc. Although the initial RAID configuration may have be based on standard/expected metrics provided by the storage drive manufacturer(s), the actual drive reliability metrics may differ and thus the RAID engine may identify a new RAID configuration that is different from the initial RAID configuration at a later time. If the initial RAID configuration is RAID5 and if reliability is now poorer than expected, the RAID engine may decide to use RAID6 in place of RAID5 to strengthen redundancy. Likewise, after a period of further operation, the actual drive reliability metrics may change again and thus the RAID engine may identify yet another new RAID configuration (e.g., a switch from RAID6 back to RAID5, a switch to RAID mirroring, etc.).

As another example, the RAID engine may input the actual number of drives currently in use in the storage array (or system). Here, storage drives may have been added to the storage array over time to increase storage capacity, to create additional RAID resiliency sets handled by the same storage processing circuitry, etc. However, the RAID engine may view the larger number of drives to have substantially increased the probability that a second drive failure will occur while rebuilding in response to a first drive failure. Along these lines, if the initial RAID configuration is RAID5 and the number of drives in the storage array is now higher, the RAID engine may decide to use RAID6 in place of RAID5 to increase redundancy and thus decrease the likelihood of rebuild.

As yet another example, the RAID engine may consider rebuild time to be the most critical factor since, during rebuild, the storage array is in a degraded state and an additional drive failure could then lead to data loss. Along these lines, the RAID engine may monitor various factors/events/criteria (e.g., current storage array metrics) that may impact rebuild time such as current drive performance, current system performance, current drive size, adding/removal of drives, and so on.

Regarding drive performance, drives that perform faster IOs (e.g., write operations, read operation, etc.) will provide faster rebuild times. Accordingly, the RAID engine may choose a RAID configuration with higher redundancy such as RAID6 over RAID5 if the RAID configuration has slower storage drives.

Regarding system performance, if drive performance is not a bottleneck, system performance may become a bottleneck. That is, lower end storage arrays (or platforms) may not have enough CPU power and/or bandwidth to achieve a desired rebuild time or rebuild rate (e.g., the resources to rebuild X terabytes of data within 6 hours, or 4 hours, or 3 hours, etc.). In such situations, the RAID engine may select a RAID configuration with higher redundancy (e.g., RAID6 over RAID5).

Regarding drive size, suppose there is a maximum (or fixed) amount of time permitted for rebuild. Since the rebuild rate (e.g., X terabytes rebuilt in Y hours) may be a function of drive size, a storage array with larger drives which require a faster rebuild rate. However, if the rebuild rate cannot be increased (e.g., due to resource limitations, bottlenecks, etc.), the RAID engine may choose a RAID configuration with higher RAID redundancy (e.g., RAID6 over RAID5).

Other factors, metrics, parameters, and so on are suitable for use as well. For example, if there is RAID spare space available, a rebuild may be started immediately when a drive fails. However, if spare space is not available, the RAID engine may gracefully lower RAID redundancy on a RAID configuration (e.g., from RAID6 to RAID5) in order to obtain spare space for a rebuild. Such a RAID transformation helps avoid degraded-reads for host-IO response time until spare space is made available and rebuilding is complete.

It should be understood that dynamic RAID transformation may involve a variety of activities. Such activities may include RAID configuration selection, moving data out of a RAID configuration, unmapping drive segments from a freed RAID configuration, remapping drive segments, etc.

RAID configuration selection, as mentioned earlier, may be performed by RAID configuration identification circuitry 220 (also see FIG. 2). In particular, this activity involves scanning the existing RAID configurations within the data storage equipment to determine whether the existing RAID configuration are satisfactory (e.g., meet requirements, optimal, etc.) or unsatisfactory (e.g., below their required levels). If an existing RAID configuration is not at a required level, the RAID engine converts the existing RAID configuration into an identified new RAID configuration that satisfies the requirements.

In the context of solid state storage drives (SSDs), RAID transformation may leverage garbage collection services to move data out of an existing RAID configurations. For example, suppose that RAID transformation is from RAID5 (4+1) to RAID5(8+1) or vice versa to alter the RAID-width of the existing RAID configuration. A garbage collection service may be employed to remove data from the existing RAID configuration thus enabling the existing RAID configuration to be marked as free.

In the context of adding or removing RAID redundancy, suppose that RAID transformation is from RAID5(8+1) to RAID6(8+2) or vice versa. Here, a RAID sub-module may be employed to add or remove an additional parity position.

In the context of unmapping, once an existing RAID configuration is marked as free, the existing RAID configuration may be unmapped into constituent drive segments. For example, a RAID5(4+1) configuration may be unmapped into five constituent drive segments.

In the context of remapping, constituent drive segments may be remapped to form a new RAID configuration. For example, in a RAID transformation from RAID5(4+1) to RAID5(8+1), nine available drive segments are remapped to form the RAID5(8+1) configuration. Further details will now be provided with reference to FIGS. 4 and 5.

Figure 4:
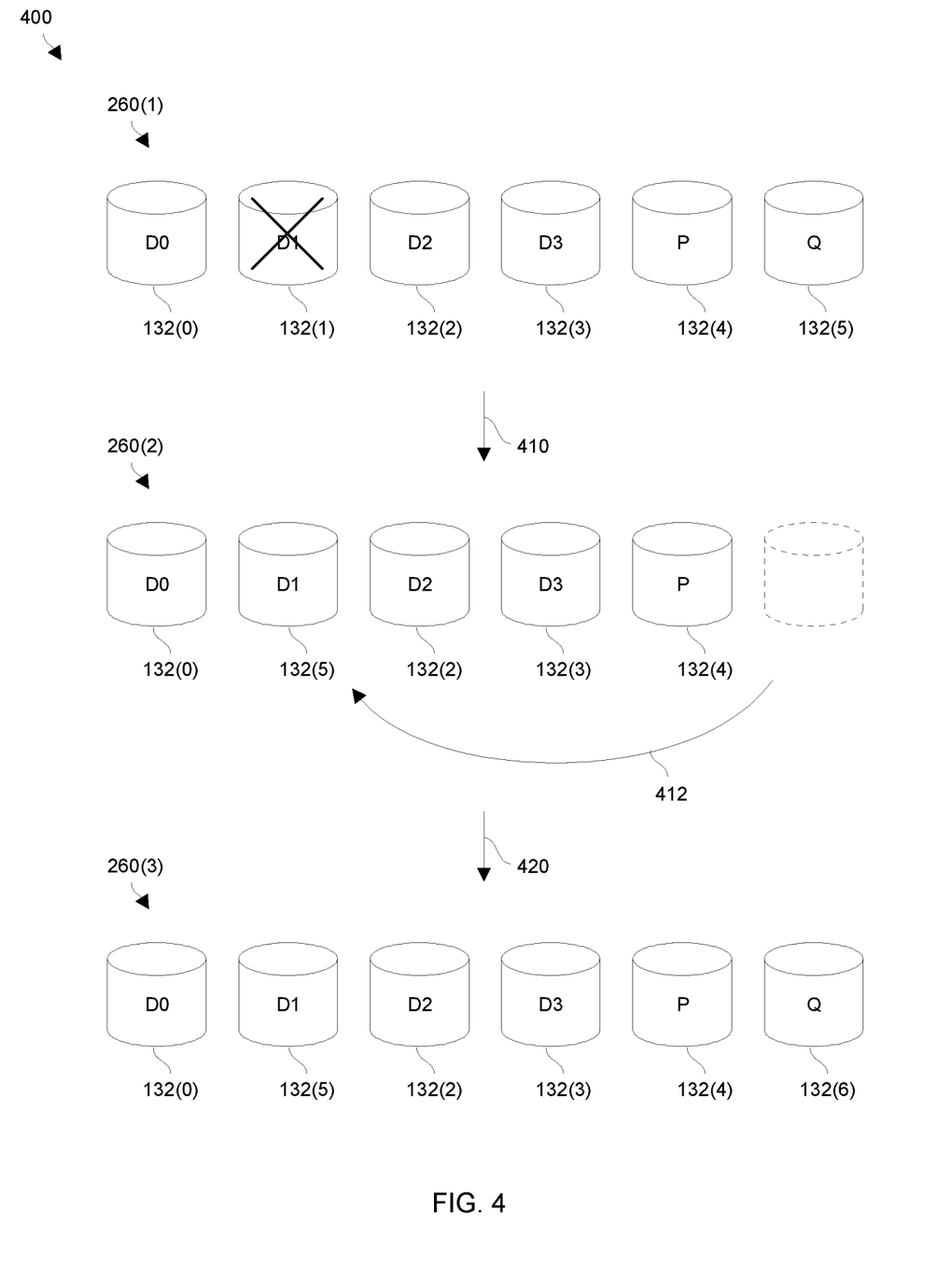
FIG. 4 is a block diagram of a RAID transformation example in accordance with certain embodiments.
Figure 5:
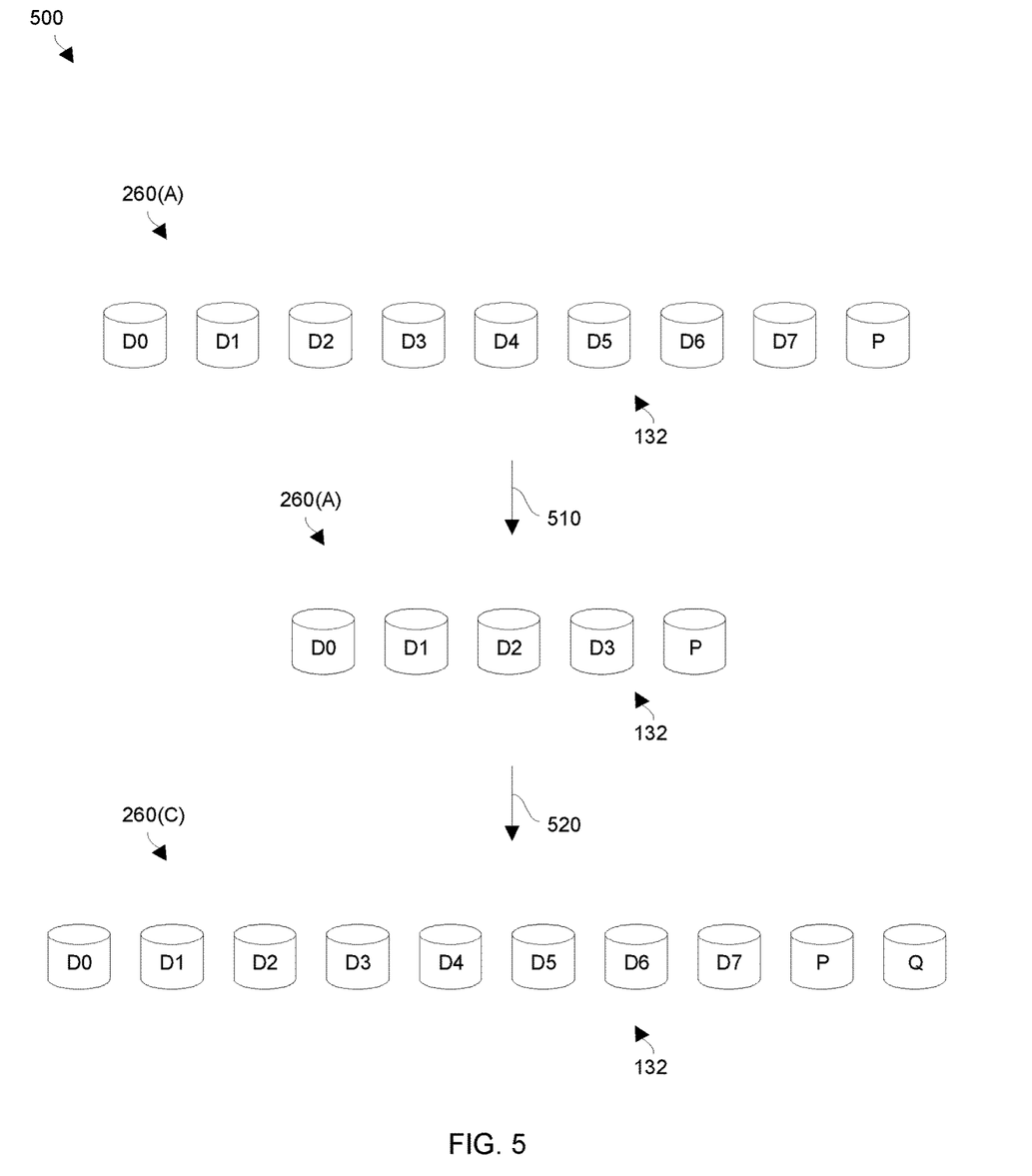
FIG. 5 is a block diagram of another RAID transformation example in accordance with certain embodiments.

FIGS. 4 and 5 provide different RAID transformation examples. FIG. 4 shows a view 400 of dynamic RAID transformations that change RAID-type. FIG. 5 shows a view 500 of dynamic RAID transformations that change RAID-width.

Suppose that the data storage equipment 104 has a first RAID configuration 260(1) which provides RAID6(4+2) data protection (also see FIG. 1). Along these lines and as shown FIG. 4, the first RAID configuration 260(1) includes six storage drives 132(0), 132(1), 132(2), 132(3), 132(4), and 132(5) holding various data which includes data elements D0, D1, D2, D3, D4, P, and Q, respectively. Data elements D1, . . . , D4 represent actual data, and data elements P and Q represent parity. This first RAID configuration 260(1) is capable of withstanding two drive failures without data loss since the data stored within the first RAID configuration 260(1) may be derived from any four remaining (or non-failed) storage drives 132.

Further suppose that the RAID engine 210 has been monitoring operation of the first RAID configuration 260(1) over time (also see FIG. 2). In particular, the RAID engine 210 receives storage array parameters 240 regarding the first RAID configuration 260(1) and decides whether the first RAID configuration 260(1) should be transformed from RAID6(4+2) data protection to something different.

Now, suppose that the storage drive 132(1) fails (denoted by the "X") and that there are no spare storage drives 132 available within the storage array. In this situation, based on the storage array parameters 240, the RAID engine 210 may identify RAID5(4+1) to be the best RAID configuration. Accordingly, the RAID engine 210 may dynamically perform RAID transformation on the first RAID configuration 260(1) to replace the RAID6(4+2) configuration with a RAID5(4+1) configuration.

To dynamically transform the first RAID configuration 260(1) from RAID6(4+2) to RAID5(4+1) (arrow 410 in FIG. 4), the RAID engine 210 first repurposes the storage drive 132(5) (arrow 412). That is, the storage drive 132(5) which previously held data element Q (i.e., parity) is reconfigured to hold the data element D1. This operation may involve removing the data from the storage drive 132(5), rebuilding the data element D1 from the data elements residing on the remaining storage drives 132 onto the storage drive 132(5), and updating various mappings so that future access to the data element D1 is via the storage drive 132(5). In some embodiments, such dynamic transformation is performed automatically without user involvement.

When RAID transformation is complete, the data elements D0, D1, D2, D3, D4, and P now reside on storage drives 132(0), 132(5), 132(2), 132(3), and 132(4), respectively. Accordingly, the data now resides within a second RAID configuration 260(2) that provides RAID5(4+1) data protection. In particular, the data is still protected against a storage drive failure, but may perform better than the degraded RAID6(4+2) configuration (e.g., rebuilding D1 occurred within predefined time constraints, faster IOs in the future, etc.), and so on.

Now, suppose that a spare storage drive 132(6) is added to the data storage equipment 104. In response to this event, the RAID engine 210 may determine that the data should now reside in a RAID6(4+2) configuration (i.e., the original RAID configuration). That is, based on newer storage array parameters 240, the RAID engine 210 may now identify RAID6(4+2) to be the best RAID configuration. Accordingly, the RAID engine 210 may dynamically perform RAID transformation on the second RAID configuration 260(2) to replace the RAID5(4+1) configuration with a RAID6(4+2) configuration, i.e., the third RAID configuration 260(3).

To dynamically transform the second RAID configuration 260(2) from RAID5(4+1) back to RAID6(4+2), the RAID engine 210 repurposes the spare storage drive 132(6) (arrow 420 in FIG. 4). That is, the storage drive 132(6) which may have been added simply as a hot spare is reconfigured to hold the data element Q (i.e., parity). This operation may involve computing the parity Q from the other data elements and storing the parity Q in the storage drive 132(6), as well as updating various mappings so that future access to the parity Q is via the storage drive 132(6). In some embodiments, such dynamic transformation is performed automatically without user involvement.

At this point, it should be understood that the RAID engine 210 is capable of decreasing or increasing RAID redundancy dynamically. Along these lines, RAID redundancy decreased during transformation from the first RAID configuration 260(1) to the second RAID configuration 260(2). Furthermore, RAID redundancy increased during transformation from the second RAID configuration 260(2) to the third RAID configuration 260(3).

Alternatively or additionally, the RAID engine 210 may dynamically adjust RAID-width. Along these lines and as shown in FIG. 5, the RAID engine 210 may transform a wider RAID configuration 260(A) to a narrower RAID configuration 260(B) (arrow 510).

That is, the RAID configuration 260(A) uses RAID5(8+1) data protection in which there is no data loss when there is a failure of any one of the storage drives 132 of the RAID configuration 260(A). The RAID engine 210 may select the RAID configuration 260(A) in situations in which the likelihood of a drive failure is low and the data storage equipment 104 strives for high storage efficiency.

However, at some point, the RAID engine 210 may decide that a narrower RAID configuration 260(A) is better suited. For example, the storage array parameters 240 (FIG. 2) may indicate that it would be difficult to perform a rebuild within a required rebuild maximum time (e.g., 4 hours) so the RAID-width should be narrowed to reduce the likelihood of a storage drive failure in the RAID configuration 260(A).

To perform such a transformation operation, the RAID engine 210 may move data, combine data elements, generate new parity, unmap and remap drive segments, etc. to create the RAID configuration 260(B) which provides RAID5(4+1) data protection. With the RAID configuration 260(B), there is less storage efficiency but also lower probability of encountering a storage drive failure. This is an example of dynamic RAID transformation which involves a change in RAID-width.

Subsequently, after a period of further operation, the RAID engine 210 may decide to perform dynamic RAID transformation again. For example, it was earlier explained that the RAID engine 210 could decide to transform a RAID5(4+1) configuration into a RAID6(4+2) in response to new storage array parameter 240 input (see arrow 420 in FIG. 4).

Alternatively, the RAID engine 210 could decide to increase RAID-width. Along these lines, the RAID engine 210 may decide to dynamically transform the RAID configuration 260(B) into a RAID configuration 260(C) which provides RAID6(8+2) data protection. Perhaps the storage array parameter 240 now indicates that there are large number of new available storage drives 132 and the likelihood of a storage drive failure is very low.

As shown in FIG. 5, this is an example of changing both the RAID-width and RAID-type. To perform this RAID transformation operation, the RAID engine 210 may move data, generate new data elements from existing data elements, generate new parity, unmap and remap drive segments, etc. to create the RAID configuration 260(C) in place of the RAID configuration 260(B). In accordance with certain embodiments, the RAID engine 210 may invoke various services such as garbage collection to move data, RAID sub-modules to generate parity, combinations thereof, and so on.

It should be understood that other RAID transformations are suitable as well. Such transformations may change the RAID-type (e.g., among mirroring with a spare, RAID5 with a spare, RAID5 without a spare, RAID6 with a spare, and so on). Alternatively or additionally, such transformations may change the RAID-width (e.g., 1+1, 4+1, 8+1, 16+1, 4+2, 8+2, 16+2, and so on). Other RAID-types and RAID-widths are suitable as well. Further details will now be provided with reference to FIG. 6.

Figure 6:
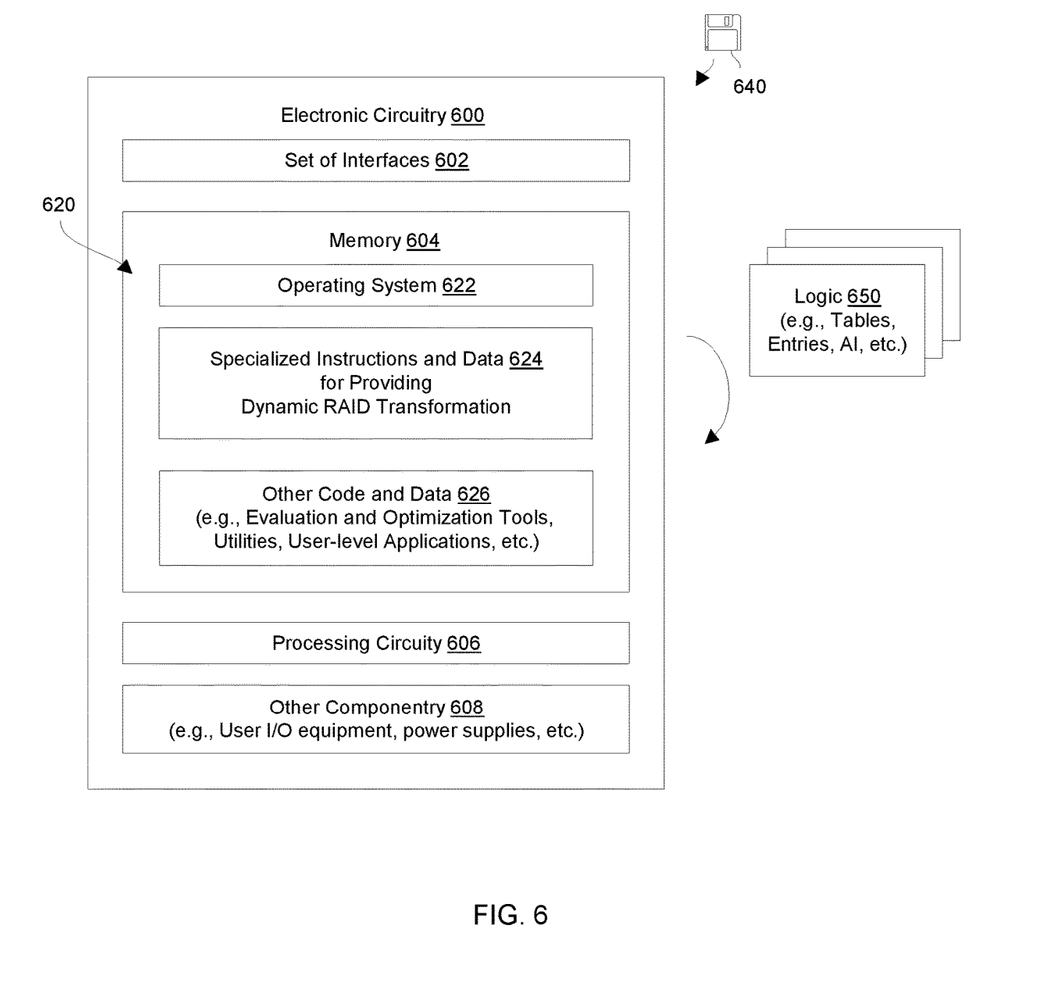
FIG. 6 is a block diagram of electronic circuitry which is suitable for use for at least a portion of the storage system setting of FIG. 1 in accordance with certain embodiments.

FIG. 6 is a block diagram of electronic circuitry 600 which is suitable for use for at least a portion of a RAID engine that performs dynamic RAID transformation in accordance with certain embodiments (also see FIGS. 1 and 2). The electronic circuitry 600 includes a set of interfaces 602, memory 604, processing circuitry 606, and other circuitry 608. In some arrangements, the electronic circuitry 600 may form a portion of the storage processing circuitry 130 of the data storage equipment 104 of the storage system setting 100 (also see FIG. 1).

The set of interfaces 602 is constructed and arranged to connect the electronic circuitry 600 to the communications medium 106 (FIG. 1) to enable communications with other devices of the storage system setting 100 (e.g., the host computers 102). Such communications may be IP-based, SAN-based, cellular-based, cable-based, fiber-optic based, wireless, cloud-based, combinations thereof, and so on. Additionally, the set of interfaces 602 is constructed and arranged to connect the electronic circuitry 600 other local equipment such as the set of storage devices 132. Accordingly, the set of interfaces 602 may include one or more host interfaces (e.g., a computer network interface, a fibre-channel interface, etc.), one or more storage device interfaces (e.g., a host adapter or HBA, etc.), and other interfaces. As a result, the set of interfaces 602 enables the electronic circuitry 600 to robustly and reliably communicate with various apparatus.

The memory 604 is intended to represent both volatile storage (e.g., DRAM, SRAM, etc.) and non-volatile storage (e.g., flash memory, magnetic memory, etc.). The memory 604 stores a variety of software constructs 620 including an operating system 622, specialized instructions and data 624, and other code and data 626. The operating system 622 refers to particular control code such as a kernel to manage computerized resources (e.g., processor cycles, memory space, etc.), the I/O stack (e.g., drivers), and so on. The specialized instructions and data 624 refers to particular instructions for providing dynamic RAID transformation. In some arrangements, the specialized instructions and data 624 is tightly integrated with or part of the operating system 622 itself. The other code and data 626 refers to applications and routines to provide additional operations and services (e.g., performance measurement tools, etc.), user-level applications, administrative tools, utilities, and so on.

The processing circuitry 606 is constructed and arranged to operate in accordance with the various software constructs 620 stored in the memory 604. As will be explained in further detail shortly, the processing circuitry 606 executes the operating system 622 and the specialized code 624 to form specialized circuitry that robustly and reliably manages host data on behalf of a set of hosts. Such processing circuitry 606 may be implemented in a variety of ways including via one or more processors (or cores) running specialized software, application specific ICs (ASICs), field programmable gate arrays (FPGAs) and associated programs, discrete components, analog circuits, other hardware circuitry, combinations thereof, and so on. In the context of one or more processors executing software, a computer program product 640 is capable of delivering all or portions of the software constructs 620 to the electronic circuitry 600. In particular, the computer program product 640 has a non-transitory (or non-volatile) computer readable medium which stores a set of instructions that controls one or more operations of the electronic circuitry 600. Examples of suitable computer readable storage media include tangible articles of manufacture and apparatus which store instructions in a non-volatile manner such as DVD, CD-ROM, flash memory, disk memory, tape memory, and the like.

The other componentry 608 refers to other hardware of the electronic circuitry 600. Along these lines, the electronic circuitry 600 may further include special user I/O equipment (e.g., a service processor), buses, cabling, adaptors, auxiliary apparatuses, other specialized data storage componentry, etc.

During operation, the electronic circuitry 600 may form the RAID configuration identification circuitry 220 and/or RAID transformation circuitry 230 of the RAID engine 210 (also see FIG. 2). Along these lines, the electronic circuitry 600 may be provisioned with logic 650 (e.g., rules, configuration tables, artificial intelligence/machine learning, policies, algorithms, combinations thereof, etc.) that enable the RAID engine 210 to smartly select different RAID configurations 260 for different situations. For example, the RAID engine 210 may plot (or map) a variety of RAID configurations in a multi-dimensional space, and then choose RAID configurations 260 based on matching current storage array parameters 240 (e.g., operating metrics produced over the last month, or week, or day, etc.) to RAID configurations 260 within the multi-dimensional space. Other selection methodologies are suitable for use as well.

As described above, improved techniques are directed to providing dynamic RAID transformation in which a storage array transforms an existing RAID configuration 260 into a new RAID transformation 260 while the storage array remains in operation. Along these lines, for an existing RAID configuration 260 that currently stores data, specialized circuitry chooses an appropriate new RAID configuration 260 suitable for the storage array to satisfy certain requirements (e.g., to maintain a desired reliability such as 5 9s). Then, the specialized circuitry transforms the existing RAID configuration 260 into the new RAID configuration 260. For example, the specialized circuitry may automatically unmap and/or remap all or part of the existing RAID configuration 260 to generate the new RAID configuration 260 in real-time while the storage array remains available. Accordingly, such techniques provide a dynamic mechanism to optimize RAID overhead and performance while maintaining desired reliability.

One should appreciate that the above-described techniques do not merely collect and store data. Rather, the disclosed techniques involve improving redundancy, controlling rebuild times/rates, etc. Accordingly, such techniques provide for better data protection, reliability, flexibility, and so on.

While various embodiments of the present disclosure have been particularly shown and described, it will be understood by those skilled in the art that various changes in form and details may be made therein without departing from the spirit and scope of the present disclosure as defined by the appended claims.

For example, it should be understood that various components of the storage system setting 100 such as the host computers 102, etc. are capable of being implemented in or "moved to" the cloud, i.e., to remote computer resources distributed over a network. Here, the various computer resources may be distributed tightly (e.g., a server farm in a single facility) or over relatively large distances (e.g., over a campus, in different cities, coast to coast, etc.). In these situations, the network connecting the resources is capable of having a variety of different topologies including backbone, hub-and-spoke, loop, irregular, combinations thereof, and so on. Additionally, the network may include copper-based data communications devices and cabling, fiber optic devices and cabling, wireless devices, combinations thereof, etc. Furthermore, the network is capable of supporting LAN-based communications, SAN-based communications, combinations thereof, and so on.

It should be understood that existing solutions may involve a human picking the RAID-type and the RAID-width at the time of creating a RAID extent. The RAID extent then remains static throughout operation.

However, in accordance with certain embodiments disclosed herein, a RAID engine provides an important dynamic functionality in a storage system which is to protect data against drive failures and thus improving system reliability. RAID algorithms may achieve this by adding redundancy (e.g., mirror, single parity, double parity, etc.) and also maintaining spare disk (virtual or physical) such that rebuild of a failed drive can be started immediately and/or automatically after drive failure.

It should be appreciated that different RAID configuration come with different costs. For example, there is the capacity cost to provide redundancy. Additionally, there is the performance cost to calculate, write and rebuild parity.

In accordance with certain embodiments, a dynamic mechanism optimizes RAID overhead and performance while maintaining desired reliability (e.g., 5 9s). Such operation may occur automatically thus alleviating the need for use intervention.

Such a solution may involve multiple aspects. First, a RAID policy circuit (or engine) may determine the appropriate RAID protection needed for the system to maintain desired reliability (e.g., 5 9s.) when managing a set of storage objects. Second, a mechanism may dynamically transform RAID-type and/or RAID-width of a current RAID configuration holding the set of storage objects.

In accordance with certain embodiments, the RAID policy engine takes several parameters into consideration for its recommendation. Some of these parameters are:

3.1.1 Drive Reliability

Drive reliability is measure by such metrics as MTBF (mean time between failure), LIBER (uncorrectable error rates), etc.

If these metrics are poor, the RAID policy engine will choose higher Raid redundancy (e.g., RAID-5 vs. RAID-6).

3.1.2 Number of Drives

Reliability of RAID in a storage system is a function of reliability of each drive and also number of drives in the system. The higher the number of drives in the system, the higher is the probability that any one of those drives takes a failure or a secondary drive takes a failure while rebuilding for first drive's failure.

If number of drives in the system is higher, RAID policy engine may choose higher RAID redundancy (e.g., RAID-5 vs. RAID-6).

3.1.3 Rebuild Time and Rebuild Rate

Rebuild time is critical as it determines how long Raid segment is in degraded state. If during Rebuild window there is an additional drive failure, it could lead to data loss. There are several factors determining Rebuild time:

3.1.3.1. Drive Performance

Drive performance is critical factor in determining rebuild time. For example, SSD drives can sustain 1000s of rebuild related IOs whereas HDDs can only sustain 10s or 100s of rebuild IOs.

So, for lower performing drives, the RAID policy engine may choose higher RAID redundancy (e.g., Raid-6).

3.1.3.2. System Performance

In cases where drive is not a bottleneck for rebuild time, system performance could become a bottleneck. For example, lower end platforms may not have enough CPU and bandwidth to achieve desired rebuild rate and so may not meet required rebuild time to maintain reliability.

In such cases, the RAID policy engine may choose higher RAID redundancy.

3.1.3.3. Drive Size

Reliability is a function of rebuild time. If desired rebuild time is fixed, then rebuild rate is a function of drive size. Larger the drive, the higher is the need for rebuild rate.

If rebuild rate cannot be increased because of other bottlenecks, then policy engine chooses higher RAID redundancy.

3.1.4 Spare Space Availability

If RAID spare space is available, rebuild is immediately started when a drive fails. But in cases when spare-space is not available, the RAID policy engine may choose to gracefully lower RAID redundancy. For example, see picture below where degraded RAID-6 is transformed to RAID-5. Such transformation helps with avoiding degraded-reads for host-IO until spare-space is made available and rebuild is complete.

Based on such considerations as described above, the RAID policy engine chooses the appropriate RAID-type and RAID-width to minimize capacity-overhead while maintaining desired reliability and performance.

In accordance with certain embodiments, the RAID policy engine continuously monitors the system for events such as drive failures, adding of new/replacement drives, etc. and reevaluates desired RAID-type and RAID-width.

Some of the options for the RAID policy engine are:
RAID-types: Mirror with spare, Raid-5 with spare, Raid-6 without spare, Raid-6 with spare, etc.
RAID-widths: 1+1, 4+1, 8+1, 16+1, 4+2, 8+2, 16+2, etc.

There are several steps involved to achieving RAID transformation. In accordance with certain embodiments, the main steps include:

3.2.1 Raid Segment Selection

This step involves scanning all the RAID extents (or Ubers) to check if they are at required RAID redundancy level. If they are not, those segments will be selected to perform RAID transformation and convert them to required level.

This step is performed whenever the RAID policy engine chooses a new RAID-redundancy level for the system (or for the stored set of objects).

3.2.2 Moving Data Out of Segment

If RAID-type/RAID-width needs to be transformed (for example from 4+1 to 8+1 or vice-versa), garbage-collection functionality may be leveraged to move data out of the RAID extent (or Uber) and mark it as free.

If only RAID-type needs to be transformed (for example from 8+1 to 8+2 or vice-versa), it can be achieved within a RAID sub-module by adding or removing additional parity position.

3.2.3 Unmaping Segment

After RAID extents requiring transformation are marked as free, they are unmapped into their constituent drive segments. For example, a 4+1 Raid extent may be unmapped into 5 constituent drive segments.

3.2.4 Remaping Segment

After the unmapping of RAID extents, constituent drive-segments are remapped into new RAID extents which are at desired RAID-type and RAID-width.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document. Such modifications and enhancements are intended to belong to various embodiments of the disclosure.

What is claimed is:

1. A method of providing dynamic redundant array of independent disks (RAID) transformation, the method comprising:
    measuring a set of storage array parameters for an existing RAID configuration residing in a storage array;
    identifying a new RAID configuration to use in place of the existing RAID configuration based on the measured set of storage array parameters; and
    after the new RAID configuration is identified, transforming the existing RAID configuration into the new RAID configuration;
wherein transforming the existing RAID configuration into the new RAID configuration includes:
    automatically changing storage segment mappings and moving data among the storage segment mappings in response to identifying the new RAID configuration;
wherein the storage segment mappings are pluralities of drive segments of physical storage, the pluralities of drive segments constituting respective RAID configurations; and
wherein moving the data among the storage segment mappings includes:
    in response to identifying the new RAID configuration, reading the data from an initial plurality of drive segments constituting the existing RAID configuration; and
    writing the data to a target plurality of drive segments to free the existing RAID configuration to be unmapped.

2. The method of claim 1 wherein the existing RAID configuration is a first RAID configuration having a first RAID type and a first RAID width; and
wherein identifying the new RAID configuration includes:
    inputting the measured set of storage array parameters into a RAID engine which is constructed and arranged to perform a RAID configuration identification operation that specifies, as the new RAID configuration, a second RAID configuration having a second RAID type and a second RAID width;
wherein at least one of: (i) the first RAID type is different from the second RAID type and (ii) the first RAID width is different from the second RAID width.

3. The method of claim 2, further comprising:
    configuring the RAID engine to perform RAID configuration identification operations that select recommended RAID configurations from a plurality of possible RAID configurations based on different sets of storage array parameters.

4. The method of claim 3, further comprising:
    directing the RAID engine to periodically perform new RAID configuration identification operations in response to a predefined schedule.

5. The method of claim 3, further comprising:
    directing the RAID engine to perform new RAID configuration identification operations in response to predefined events.

6. The method of claim 1 wherein a set of storage objects resides within the existing RAID configuration prior to transforming; and
wherein transforming the existing RAID configuration into the new RAID configuration includes:
performing a RAID configuration transformation operation that provides the new RAID configuration in place of the existing RAID configuration, the set of storage objects residing within the new RAID configuration upon completion of the RAID configuration transformation operation.

7. The method of claim 6 wherein the existing RAID configuration provides a first level of RAID redundancy; and
wherein performing the RAID configuration transformation operation includes:
providing the new RAID configuration with a second level of RAID redundancy that is higher than the first level of RAID redundancy.

8. The method of claim 7 wherein the existing RAID configuration provides a RAID Level 5 data protection scheme as the first level of RAID redundancy; and
wherein providing the new RAID configuration includes:
providing a RAID Level 6 data protection scheme as the second level of RAID redundancy that is higher than the first level of RAID redundancy.

9. The method of claim 6 wherein the existing RAID configuration provides a first level of RAID redundancy; and
wherein performing the RAID configuration transformation operation includes:
providing the new RAID configuration with a second level of RAID redundancy that is lower than the first level of RAID redundancy.

10. The method of claim 9 wherein the existing RAID configuration provides a RAID Level 6 data protection scheme as the first level of RAID redundancy; and
wherein providing the new RAID configuration includes:
providing a RAID Level 5 data protection scheme as the second level of RAID redundancy that is-lower than the first level of RAID redundancy.

11. The method of claim 6 wherein the existing RAID configuration provides a first RAID width; and
wherein performing the RAID configuration transformation operation includes:
providing the new RAID configuration with a second RAID width that is wider than the first RAID width.

12. The method of claim 11 wherein the first RAID width includes a first number of storage devices; and
wherein providing the new RAID configuration includes:
providing the new RAID configuration with, as the second RAID width, a second number of storage devices that is larger than the first number of storage devices.

13. The method of claim 6 wherein the existing RAID configuration provides a first RAID width; and
wherein performing the RAID configuration transformation operation includes:
providing the new RAID configuration with a second RAID width that is narrower than the first RAID width.

14. The method of claim 13 wherein the first RAID width includes a first number of storage devices; and
wherein providing the new RAID configuration includes:
providing the new RAID configuration with, as the second RAID width, a second number of storage devices that is smaller than the first number of storage devices.

15. The method of claim 1 wherein measuring the set of storage array parameters for the existing RAID configuration includes:
assessing a current count of storage devices available to the existing RAID configuration.

16. The method of claim 15 wherein the new RAID configuration is identified based on the current count of storage devices available to the existing RAID configuration being different from a previous count of storage devices available to the existing RAID configuration.

17. The method of claim 1 wherein the initial plurality of drive segments stores a mix of valid data and invalid data;
wherein transforming the existing RAID configuration into the new RAID configuration further includes:
prior to changing the storage segment mappings, initiating a garbage collection service that consolidates the valid data stored in the initial plurality of drive segments to free the initial plurality of drive segments to be unmapped, the garbage collection service identifying the target plurality of drive segments as having unused storage space in which to store the valid data consolidated through garbage collection.

18. Electronic equipment, comprising:
memory; and
control circuitry coupled to the memory, the memory storing instructions which, when carried out by the control circuitry, cause the control circuitry to perform a method of:
measuring a set of storage array parameters for an existing redundant array of independent disks (RAID) configuration residing in a storage array,
identifying a new RAID configuration to use in place of the existing RAID configuration based on the measured set of storage array parameters, and
after the new RAID configuration is identified, transforming the existing RAID configuration into the new RAID configuration;
wherein transforming the existing RAID configuration into the new RAID configuration includes:
automatically changing storage segment mappings and moving data among the storage segment mappings in response to identifying the new RAID configuration;
wherein the storage segment mappings are pluralities of drive segments of physical storage, the pluralities of drive segments constituting respective RAID configurations; and
wherein moving the data among the storage segment mappings includes:
in response to identifying the new RAID configuration, reading the data from an initial plurality of drive segments constituting the existing RAID configuration; and
writing the data to a target plurality of drive segments to free the existing RAID configuration to be unmapped.

19. The electronic equipment of claim 18 wherein the existing RAID configuration is a first RAID configuration having a first RAID type and a first RAID width; and
wherein identifying the new RAID configuration includes:
inputting the measured set of storage array parameters into a RAID engine which is constructed and arranged to perform a RAID configuration identification operation that specifies, as the new RAID configuration, a second RAID configuration having a second RAID type and a second RAID width;
wherein at least one of: (i) the first RAID type is different from the second RAID type and (ii) the first RAID width is different from the second RAID width.

20. A computer program product having a non-transitory computer readable medium which stores a set of instructions to provide dynamic redundant array of independent disks (RAID) transformation; the set of instructions, when carried out by computerized circuitry, causing the computerized circuitry to perform a method of:

measuring a set of storage array parameters for an existing RAID configuration residing in a storage array;

identifying a new RAID configuration to use in place of the existing RAID configuration based on the measured set of storage array parameters; and  after the new RAID configuration is identified, transforming the existing RAID configuration into the new RAID configuration;

wherein transforming the existing RAID configuration into the new RAID configuration includes:

automatically changing storage segment mappings and moving data among the storage segment mappings in response to identifying the new RAID configuration;

wherein the storage segment mappings are pluralities of drive segments of physical storage, the pluralities of drive segments constituting respective RAID configurations; and wherein moving the data among the storage segment mappings includes:

in response to identifying the new RAID configuration, reading the data from an initial plurality of drive segments constituting the existing RAID configuration; and  writing the data to a target plurality of drive segments to free the existing RAID configuration to be unmapped.

\* \* \* \* \*